United States Patent
Park et al.

(10) Patent No.: US 8,747,777 B2
(45) Date of Patent: Jun. 10, 2014

(54) MICROFLUIDIC APPARATUS INCLUDING MICROFLUIDIC DEVICE

(75) Inventors: Chin-sung Park, Yongin-si (KR);
Jin-tae Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1368 days.

(21) Appl. No.: 11/846,867

(22) Filed: Aug. 29, 2007

(65) Prior Publication Data

US 2008/0112854 A1 May 15, 2008

(30) Foreign Application Priority Data

Nov. 14, 2006 (KR) .................. 10-2006-0112451

(51) Int. Cl.
*B01L 3/00* (2006.01)
(52) U.S. Cl.
USPC .......... 422/503; 422/501; 422/502; 422/504; 436/180
(58) Field of Classification Search
USPC ........................................ 422/100; 436/180
See application file for complete search history.

(56) References Cited

U.S. PATENT DOCUMENTS

| | | | |
|---|---|---|---|
| 6,229,204 B1 | 5/2001 | Hembree | |
| 6,273,985 B1 | 8/2001 | DeLouise et al. | |
| 6,537,506 B1* | 3/2003 | Schwalbe et al. | 422/130 |
| 6,900,708 B2 | 5/2005 | White et al. | |
| 6,923,907 B2 | 8/2005 | Hobbs et al. | |
| 6,982,189 B2 | 1/2006 | Silverbrook | |
| 7,002,175 B1 | 2/2006 | Singh et al. | |
| 2006/0078475 A1* | 4/2006 | Tai et al. | 422/102 |

FOREIGN PATENT DOCUMENTS

| | | |
|---|---|---|
| JP | 2003133484 A | 5/2003 |
| JP | 2003152025 A | 5/2003 |
| JP | 2005147913 A | 6/2005 |

OTHER PUBLICATIONS

Moss, et al., A fabrication technology for multi-layer polymer-based microsystems with integrated fluidic and electrical functionality, ScienceDirect Sensors and Actuators B 121 (2007) pp. 689-697.

* cited by examiner

*Primary Examiner* — Dean Kwak
(74) *Attorney, Agent, or Firm* — Cantor Colburn LLP

(57) ABSTRACT

A microfluidic apparatus includes at least one microfluidic device in which flow paths are formed, a device receiving layer including a receiving part into which the at least one microfluidic device is inserted and at least one pattern layer on which patterns connected to the flow paths of the at least one microfluidic device are formed, wherein each of the at least one pattern and device receiving layers is bonded to an adjacent layer to prevent fluid leakage.

12 Claims, 9 Drawing Sheets

MICROFLUIDIC APPARATUS INCLUDING MICROFLUIDIC DEVICE

This application claims priority to Korean Patent Application No. 10-2006-0112451, filed on Nov. 14, 2006, and all the benefits accruing therefrom under 35 U.S.C. §119, the contents of which in its entirety are herein incorporated by reference.

BACKGROUND OF THE INVENTION

1. Field of the Invention

The present invention relates to microfluidics, and more particularly, to a microfluidic apparatus including a microfluidic device and a method of manufacturing the microfluidic apparatus.

2. Description of the Related Art

Microfluidics technology is used in microfluidic devices such as lab-on-a-chip systems ("LOC"), which separate or mix fluids and perform biochemical reactions using the separated or mixed fluids. However, since microfluidic devices include a substrate on which channels and chambers are formed, channel and chamber patterns become more complex as processes which are to be performed using the microfluidic devices become more complex, thereby making integration and miniaturization of microfluidic devices difficult.

Since a temperature of biochemical reaction chambers in which a biochemical reaction, such as a polymerase chain reaction ("PCR"), occurs needs to be controlled quickly and precisely, microfluidic devices may be formed of silicon (Si) or glass having a high thermal conductivity. However, reservoir chambers containing fluids prepared before the biochemical reaction or drain chambers containing fluids remaining after the biochemical reaction are bulky, and the reservoir chambers and drain chambers can perform the same function regardless of their materials. Accordingly, when all biochemical reaction chambers, reservoir chambers and drain chambers included in microfluidic devices are made of silicon or glass, a biochemical reaction efficiency is improved, however manufacturing costs thereof are increased. When all the elements of microfluidic devices are made of a polymer, however, manufacturing costs can be reduced but a reaction error rate is increased and thus a biochemical reaction efficiency is reduced.

BRIEF SUMMARY OF THE INVENTION

The present invention provides a microfluidic apparatus including a small microfluidic device and a method of manufacturing the microfluidic apparatus.

The present invention also provides a microfluidic apparatus and a method of manufacturing the microfluidic apparatus which include a microfluidic device which is smaller in size than, but equal in performance to a conventional microfluidic device including a substrate.

According to an exemplary embodiment of the present invention, a microfluidic apparatus includes at least one microfluidic device in which flow paths are formed, a device receiving layer including a receiving part into which the at least one microfluidic device is inserted and at least one pattern layer on which patterns connected to the flow paths of the at least one microfluidic device are formed, wherein each of the at least one pattern and device receiving layers is bonded to an adjacent layer to prevent fluid leakage.

In an exemplary embodiment, the adjacent layer is an adjacent device receiving layer or an adjacent pattern layer.

In an exemplary embodiment, the at least one pattern layer is a plurality of pattern layers and the device receiving layer includes a plurality of device receiving layers, at least one pattern layer of the plurality of pattern layers is disposed between the adjacent device receiving layers.

In an exemplary embodiment, the plurality of device receiving layers and the plurality of pattern layers are bonded together by one of plasma bonding or using a double-sided tape.

In an exemplary embodiment, the at least one microfluidic device may include a substrate made of silicon (Si) or glass.

In an exemplary embodiment, the patterns of the at least one pattern layer may include at least one of holes, channels and chambers.

In an exemplary embodiment, patterns of an outermost pattern layer may include an inlet hole through which fluids are introduced into the microfluidic apparatus and an outlet hole through which fluids are discharged to an external environment of the microfluidic apparatus.

In an exemplary embodiment, the device receiving layer and the at least one pattern layer may be made of a polymer.

In an exemplary embodiment, the polymer may be polydimethylsyloxane ("PDMS").

In an exemplary embodiment, each of a plurality of microfluidic devices may be stacked in the microfluidic apparatus.

In an exemplary embodiment, the device receiving layer and the at least one pattern layer constituting the microfluidic apparatus may be bonded together by one of plasma bonding or using a double-sided tape.

In an exemplary embodiment, the at least one pattern layer may be transparent such that a fluid reaction occurring in the at least one microfluidic device can be detected using fluorescence detection.

In an exemplary embodiment, the at least one pattern layer may include a window through which a fluid reaction occurring in the at least one microfluidic device can be detected using fluorescence detection.

According to another exemplary embodiment of the present invention, there is provided a method of manufacturing a microfluidic apparatus, the method includes inserting at least one microfluidic device, in which flow paths are formed, into a receiving part formed in a device receiving layer and bonding at least one pattern layer, on which patterns are formed, to a surface of the device receiving layer such that the patterns of the at least one pattern layer are connected to the flow paths of the at least one microfluidic device.

BRIEF DESCRIPTION OF THE DRAWINGS

The above and other aspects, features and advantages of the present invention will now become more apparent by describing in detail exemplary embodiments thereof with reference to the attached drawings, in which.

DETAILED DESCRIPTION OF THE INVENTION

Figure 1:
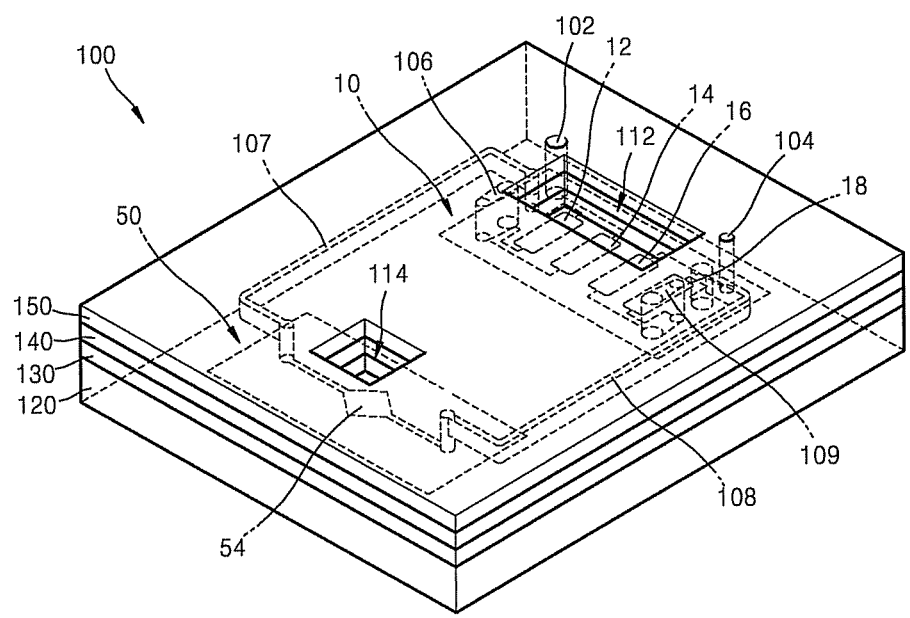
FIG. 1 is a front perspective schematic diagram view of an exemplary embodiment of a microfluidic apparatus including an exemplary embodiment of a microfluidic device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

The present invention will now be described more fully with reference to the accompanying drawings, in which exemplary embodiments of the present invention are shown.

FIG. 1 is a front perspective schematic diagram view of an exemplary embodiment of a microfluidic apparatus 100 including exemplary embodiments of microfluidic devices 10 and 50 according to the present invention. FIGS. 2A through 2D are front perspective schematic diagram views illustrating respective layers constituting the exemplary embodiments of microfluidic devices 10 and 50 of the microfluidic apparatus 100 of FIG. 1. FIG. 3 is a top plan schematic diagram view illustrating flow paths of the microfluidic devices 10 and 50 of the microfluidic apparatus 100 of FIG. 1.

Referring to FIG. 1, an exemplary embodiment of the microfluidic apparatus 100 is a rectangular parallelpiped block made of a transparent polymer. However, the present invention is not limited to the rectangular parallelpiped shape or to being formed of the transparent polymer material. The microfluidic apparatus 100 includes first and second microfluidic devices 10 and 50, a device receiving layer 120 which receives the first and second microfluidic devices 10 and 50 and first through third pattern layers 130, 140 and 150 which are sequentially stacked on the device receiving layer 120.

Figure 2A:
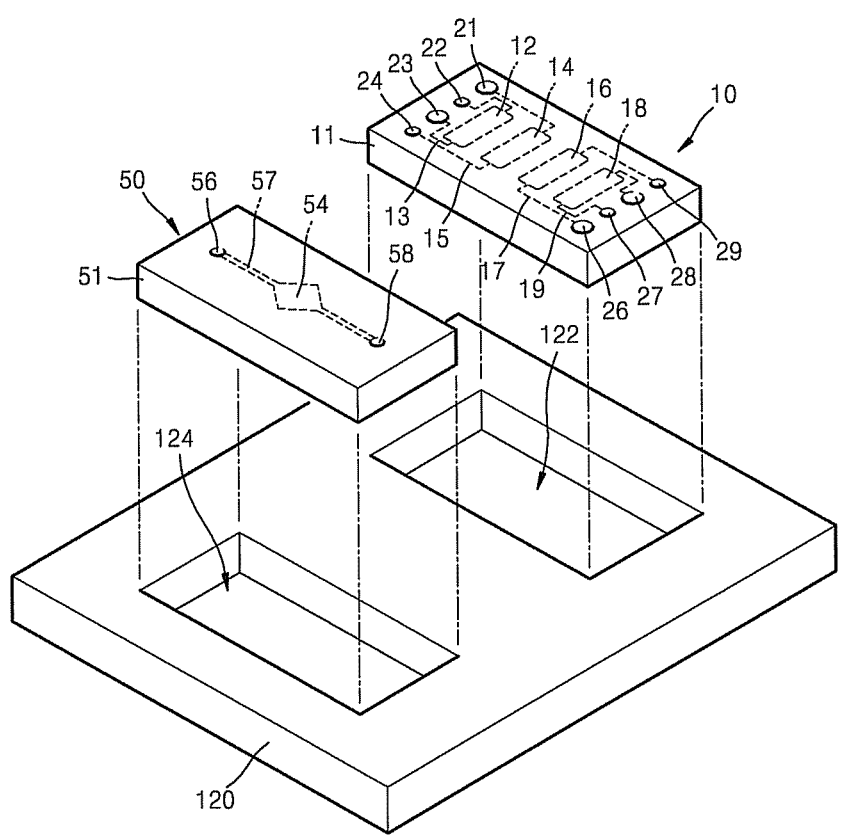
FIGS. 2A through 2D are front perspective schematic diagram views illustrating respective layers constituting the exemplary embodiment of a microfluidic device of the microfluidic apparatus of FIG. 1
Figure 3:
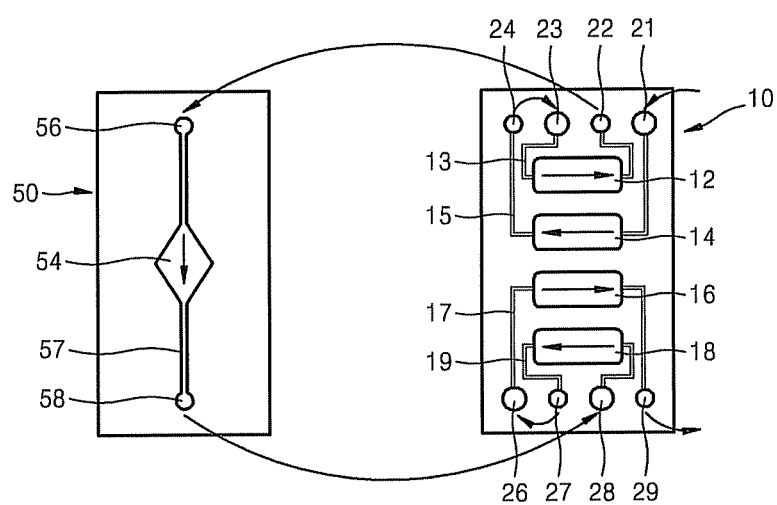
FIG. 3 is a top plan schematic diagram view illustrating flow paths of the exemplary embodiment of a microfluidic device of the microfluidic apparatus of FIG. 1.

Referring to FIG. 2A, the device receiving layer 120 is formed by molding a polymer. In an exemplary embodiment, the polymer may be polydimethylsyloxane ("PDMS"), which includes attributes such as flexibility, low cost and good processability. The device receiving layer 120 includes first and second device receiving parts 122 and 124 formed therein such that the first and second microfluidic devices 10 and 50 may be inserted into the first and second device receiving parts 122 and 124, respectively. While the first and second device receiving parts 122 and 124 are perforated in the current exemplary embodiment, as illustrated in FIG. 2A, the first and second device receiving parts 122 and 124 may be recessed grooves in alternative exemplary embodiments. In the current exemplary embodiment, since the device receiving layer 120, which is made of PDMS, is flexible, the first and second microfluidic devices 10 and 50 may be fixedly inserted into the first and second device receiving parts 122 and 124, without being loose. In exemplary embodiments, the device receiving layer 120 may be formed by removing bubbles from liquid PDMS, injecting the PDMS into a mold conforming to the device receiving layer 120, curing the PDMS and separating the cured PDMS from the mold.

The first and second microfluidic devices 10 and 50 include substrates 11 and 51 made of silicon (Si) or glass including a high thermal conductivity in order to effect precise thermal cycling during a biochemical reaction, such as a polymerase chain reaction ("PCR"). In exemplary embodiments, each of the substrates 11 and 51 may be a single silicon substrate or may include a structure in which a glass substrate is adhered to a silicon substrate.

The first microfluidic device 10 includes a top surface of the substrate 11 in which first through fourth inlet holes 21, 23, 28 and 26, through which fluids are introduced, and first through fourth outlet holes 24, 22, 27 and 29, through which fluids are discharged, are formed. The first microfluidic device 10 includes first through fourth channels 15, 13, 19 and 17 which connect the first through fourth inlet holes 21, 23, 28 and 26 with the first through fourth outlet holes 24, 22, 27 and 29, respectively, to form flow paths, and first through fourth reaction chambers 14, 12, 18 and 16 in the first through fourth channels 15, 13, 19 and 17. In exemplary embodiments, the first microfluidic device 10 is transparent such that a biochemical reaction occurring in the first through fourth reaction chambers 14, 12, 18 and 16 can be detected using fluorescence detection.

The second microfluidic device 50 includes a top surface of the substrate 51 in which an inlet hole 56, through which fluids are introduced, and an outlet hole 58, through which fluids are discharged, are formed. The second microfluidic device 50 includes a channel 57 which connects the inlet hole 56 and the outlet hole 58 to form a flow path, and a reaction chamber 54 in the channel 57. In exemplary embodiments, the second microfluidic device 50 is transparent such that a biochemical reaction occurring in the reaction chamber 54 may be detected using fluorescence detection.

In exemplary embodiments, the channels and chambers in the first and second microfluidic devices 10 and 50 are formed on the substrates 11 and 51, respectively, as patterns using photolithography and by micromachining such as etching or sandblasting. However, the present invention is not limited thereto.

Figure 2B:
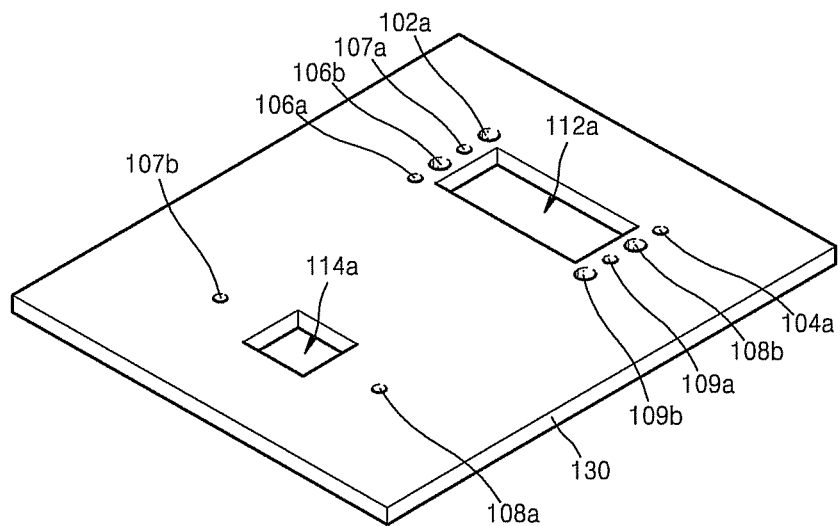

Referring to FIG. 2B, the first pattern layer 130 includes patterns which are connected to the flow paths of the first and second microfluidic devices 10 and 50 (see FIGS. 1 and 2A), and first and second windows 112a and 114a. Similar to the device receiving layer 120 (see FIG. 2A), in exemplary embodiments, the first pattern layer 130 may be formed by removing bubbles from liquid PDMS, injecting PDMS into a mold conforming to the first pattern layer 130, curing the PDMS and separating the cured PDMS from the mold.

In detail, the patterns of the first pattern layer 130 include holes 102a, 106b, 108b and 109b which are aligned with the first through fourth inlet holes 21, 23, 28 and 26 (see FIGS. 1 and 2A) of the first microfluidic device 10 and holes 106a, 107a, 109a and 104a which are aligned with the first through fourth outlet holes 24, 22, 27 and 29 of the first microfluidic device 10. The patterns of the first pattern layer 130 include a hole 107b which is aligned with the inlet hole 56 of the second microfluidic device 50 (see FIGS. 1 and 2A) and a hole 108a which is aligned with the outlet hole 58 of the second microfluidic device 50. The first and second windows 112a and 114a are perforated, and the perforated first window 112a is aligned over the reaction chambers 14, 12, 18 and 16 of the first microfluidic device 10.

Figure 2C:
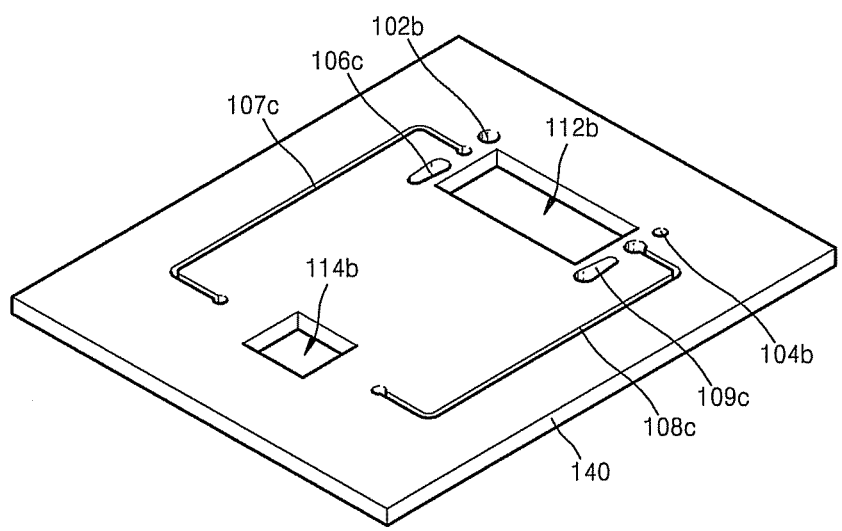

Referring to FIG. 2C, the second pattern layer 140 includes patterns, which are connected to the flow paths of the first and second microfluidic devices 10 and 50 (see FIGS. 1 and 2A) and to the patterns formed on the first pattern layer 130 (see FIGS. 1 and 2B), and first and second windows 112b and 114b, which are perforated and aligned with the first and second windows 112a and 114a of the first pattern layer 130. Similar to the device receiving layer 120 (see FIGS. 1 and 2A) and the first pattern layer 130, in exemplary embodiments, the second pattern layer 140 may be formed by removing bubbles from liquid PDMS, injecting PDMS into a mold conforming to the second pattern layer 140, curing the PDMS and separating the cured PDMS from the mold.

In further detail, the patterns of the second pattern layer 140 include a hole 102b which is aligned with the hole 102a of the first pattern layer 130, a hole 104b which is aligned with the hole 104a of the first pattern layer 130 and four channels 106c, 107c, 108c and 109c. Both ends of the channel 106c are aligned with the pair of holes 106a and 106b of the first pattern layer 130, both ends of the channel 107c are aligned with the pair of holes 107a and 107b of the first pattern layer 130, both ends of the channel 108c are aligned with the pair of holes 108a and 108b of the first pattern layer 130 and both ends of the channel 109c are aligned with the pair of holes 109a and 109b of the first pattern layer 130.

Figure 2D:
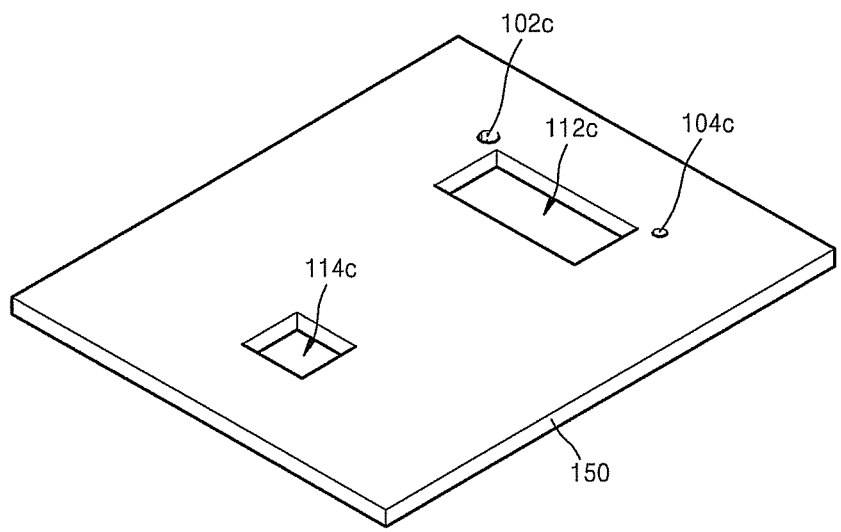

Referring to FIG. 2D, the third pattern layer 150 includes patterns which are connected to the flow paths of the first and second microfluidic devices 10 and 50 (see FIGS. 1 and 2A) and the patterns respectively formed on the first pattern layer 130 (see FIG. 2B) and the second pattern layer 140 (see FIG. 2C). The third pattern layer 150 further includes a first window 112c which is formed by perforating the third pattern layer and is aligned with each of the first windows 112a and 112b of the first and second pattern layers 130 and 140, respectively and a second window 114c which is formed by perforating the third pattern layer and is aligned with each of the second windows 114a and 114b of the first and second pattern layers 130 and 140, respectively. In detail, the patterns of the third pattern layer 150 include an inlet hole 102c which is aligned with the hole 102b of the second pattern layer 140, and an outlet hole 104c which is aligned with the hole 104b of the second pattern layer 140.

The third pattern layer 150 is an outermost layer of the microfluidic apparatus 100 (see FIG. 1), and covers the channels 106c, 107c, 108c and 109c, which are formed on the second pattern layer 140, such that the channels 106c, 107c, 108c and 109c are prevented from being exposed to an external environment of the microfluidic apparatus 100 (see FIG. 1). Fluids can be introduced into the microfluidic apparatus 100 through the inlet hole 102c and fluids can be discharged to the external environment of the microfluidic apparatus 100 through the outlet hole 104c.

Similar to the device receiving layer 120 (see FIG. 2A), the first pattern layer 130 and the second pattern layer 140, in exemplary embodiments, the third pattern layer 150 may be formed by removing bubbles from liquid PDMS, injecting the PDMS into a mold conforming to the third pattern layer 150, curing the PDMS and separating the cured PDMS from the mold. In exemplary embodiments, the device receiving layer 120 and the first through third pattern layers 130, 140 and 150 may be simultaneously formed by performing PDMS injection, curing and mold removal in a single process using a same mold.

In exemplary embodiments, the device receiving layer 120 into which the first and second microfluidic devices 10 and 50 are inserted and the first through third pattern layers 130, 140 and 150, which are sequentially stacked on the device receiving layer 120, are bonded together by plasma bonding. Plasma bonding is a process of attaching two elements by projecting oxygen plasma particles onto at least one contact surface of the two elements, activating the contact surface and forcing the two elements to contact each other. Plasma bonding can easily attach layers without gaps between the layers. However, the bonding of adjacent layers in an exemplary embodiment of a method of manufacturing the microfluidic apparatus 100 is not limited to plasma bonding, and thus may be accomplished by disposing a double-sided tape between the layers in alternative exemplary embodiments.

Referring to FIG. 1 again, the microfluidic apparatus 100, configured such that the four layers 120, 130, 140 and 150 are bonded together, includes an apparatus inlet hole 102 through which external fluids are introduced into the first inlet hole 21 (see FIG. 2A) of the first microfluidic device 10, and an apparatus outlet hole 104 through which fluids are discharged from the fourth outlet hole 29 (see FIG. 2A) of the first microfluidic device 10 to the external environment of the microfluidic apparatus 100. The microfluidic apparatus 100 further includes a first apparatus channel 106, which connects the first outlet hole 24 (see FIG. 2A) with the second inlet hole 23 (see FIG. 2A) of the first microfluidic device 10, a second apparatus channel 107, which connects the second outlet hole 22 (see FIG. 2A) of the first microfluidic device 10 with the inlet hole 56 (see FIG. 2A) of the second microfluidic device 50, a third apparatus channel 108, which connects the outlet hole 58 (see FIG. 2A) of the second microfluidic device 50 with the third inlet hole 28 of the first microfluidic device 10 and a fourth apparatus channel 109, which connects the third outlet hole 27 with the fourth inlet hole 26 of the first microfluidic device 10. The microfluidic apparatus 100 further includes a first window 112, which allows for a detection of a biochemical reaction occurring in the first microfluidic device 10 using fluorescence detection, and a second window 114, which allows for a detection a biochemical reaction occurring in the second microfluidic device 50 using fluorescence detection.

The apparatus inlet hole 102 is formed by connecting the hole 102a of the first pattern layer 130 with the hole 102b of the second pattern layer 140 and the inlet hole 102c of the third pattern layer 150, and the apparatus outlet hole 104 is formed by connecting the hole 104a of the first pattern layer 130 with the hole 104b of the second pattern layer 140 and the outlet hole 104c of the third pattern layer 150. The first apparatus channel 106 is formed by connecting the pair of holes 106a and 106b of the first pattern layer 130 with the channel 106c of the second pattern layer 140, and the second apparatus channel 107 is formed by connecting the pair of holes 107a and 107b of the first pattern layer 130 with the channel 107c of the second pattern layer 140. The third apparatus channel 108 is formed by connecting the pair of holes 108a and 108b of the first pattern layer 130 with the channel 108c of the second pattern layer 140, and the fourth apparatus channel 109 is formed by connecting the pair of holes 109a and 109b of the first pattern layer 130 with the channel 109c of the second pattern layer 140. The first window 112 and the second window 114 are formed by aligning the first windows 112a, 112b and 112c and the second windows 114a, 114b and 114c of the first through third pattern layers 130, 140 and 150, respectively.

The inventors of the present invention conducted experiments by injecting fluids into the apparatus inlet hole 102 to determine whether the flow paths connecting the first and second microfluidic devices 10 and 50 were formed in the microfluidic apparatus 100. Referring to FIGS. 1 and 3, the fluids injected into the apparatus inlet hole 102 sequentially passed through the first inlet hole 21, the first reaction chamber 14, the first outlet hole 24, the first apparatus channel 106, the second inlet hole 23, the second reaction chamber 12 and the second outlet hole 22 of the first microfluidic device 10. Next, the fluids were then transferred along the second apparatus channel 107 to the second microfluidic device 50, and then sequentially passed through the inlet hole 56, the reaction chamber 54 and the outlet hole 58 of the second microfluidic device 50. Next, the fluids were then returned along the third apparatus channel 108 to the first microfluidic device 10, and sequentially passed through the third inlet hole 28, the third reaction chamber 18, the third outlet hole 27, the fourth apparatus channel 109, the fourth inlet hole 26, the fourth reaction chamber 16 and the fourth outlet hole 29 of the first microfluidic device 10. Next, the fluids then exited through the apparatus outlet hole 104. There was no fluid leakage in the microfluidic apparatus 100.

Figure 4:
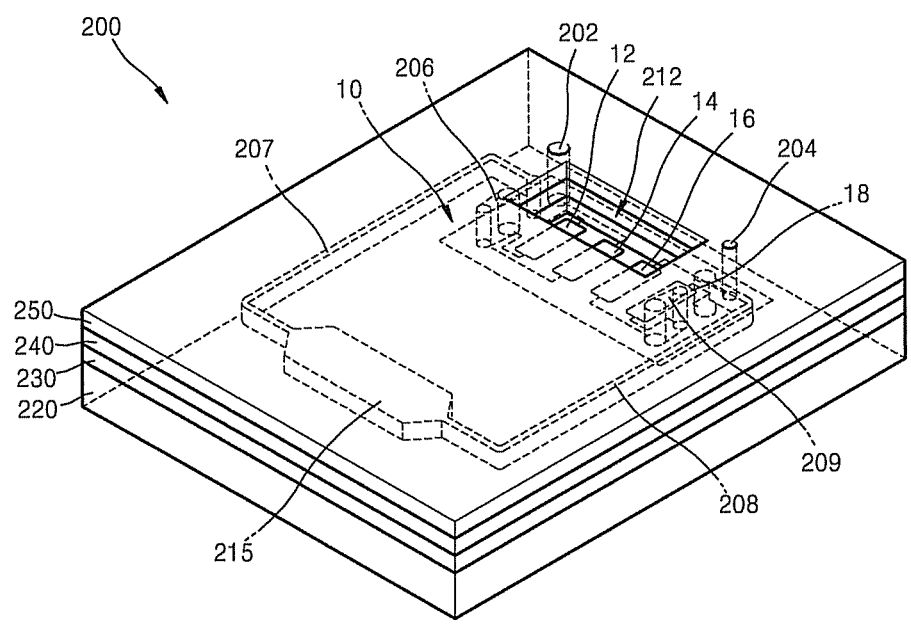
FIG. 4 is a front perspective schematic diagram view of another exemplary embodiment of a microfluidic apparatus including a microfluidic device according to the present invention.

FIG. 4 is a front perspective schematic diagram view of another exemplary embodiment of a microfluidic apparatus 100 including a microfluidic device 10 according to the present invention. FIGS. 5A through 5D are front perspective views illustrating respective layers constituting the exemplary embodiment of a microfluidic device 10 of the microfluidic apparatus 100 of FIG. 4.

Similar to the microfluidic apparatus 100 of FIG. 1, in an exemplary embodiment, a microfluidic apparatus 200 of FIG. 4 is a rectangular parallelpiped block made of a transparent polymer. Referring to FIG. 4, the microfluidic apparatus 200 includes a first microfluidic device 10, a device receiving layer 220 which receives the microfluidic device 10 and first through third pattern layers 230, 240 and 250 which are securely stacked on the device receiving layer 220. The first microfluidic device 10 of the microfluidic apparatus 200 of FIG. 4 is identical to the first microfluidic device 10 of the microfluidic apparatus 100 of FIG. 1.

Figure 5A:
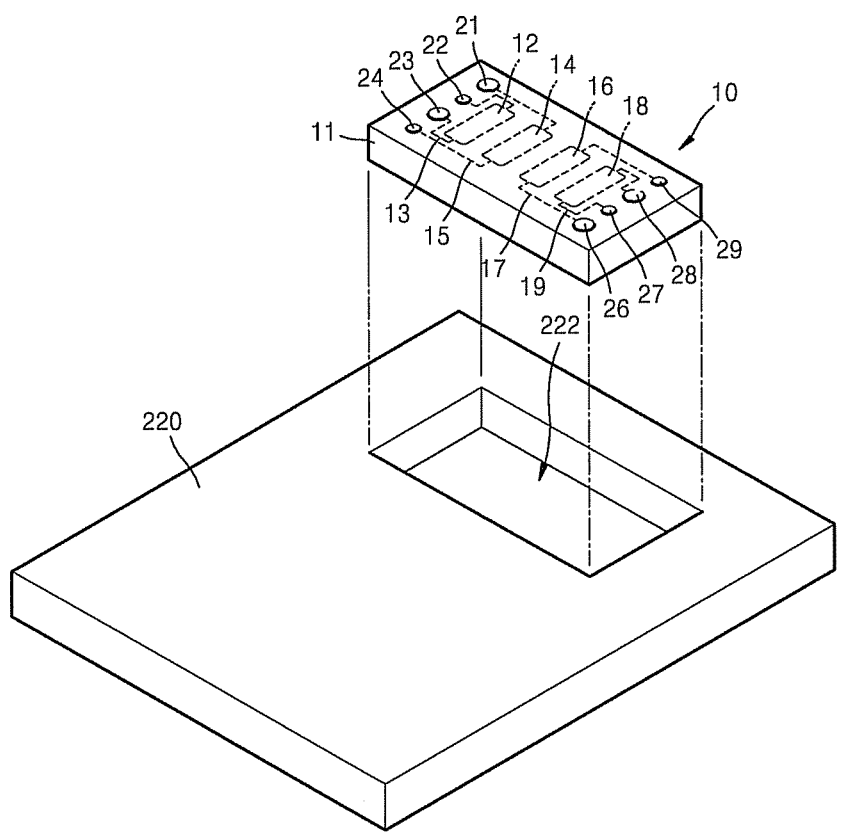
FIGS. 5A through 5D are front perspective schematic diagram views illustrating respective layers constituting the exemplary embodiment of a microfluidic device of the microfluidic apparatus of FIG. 4.

Referring to FIG. 5A, in an exemplary embodiment, the device receiving layer 220 is formed by molding a polymer such as PDMS. The device receiving layer 220 includes a device receiving part 222 which is formed by perforating the device receiving layer 220, and the first microfluidic device 10 is inserted into the device receiving part 222. The first microfluidic device 10 is fixedly inserted into the device receiving part 222, without being loose, due to the flexibility of the PDMS. The forming of the device receiving layer 220 is the same as the forming of the device receiving layer 120 (see FIG. 2A) of FIG. 1, and thus a detailed explanation thereof will be omitted. Also, the first microfluidic device 10 of FIG. 4 is the same as the first microfluidic device 10 which has already been described with reference to FIG. 1, and thus a detailed explanation thereof will also be omitted.

Figure 5B:
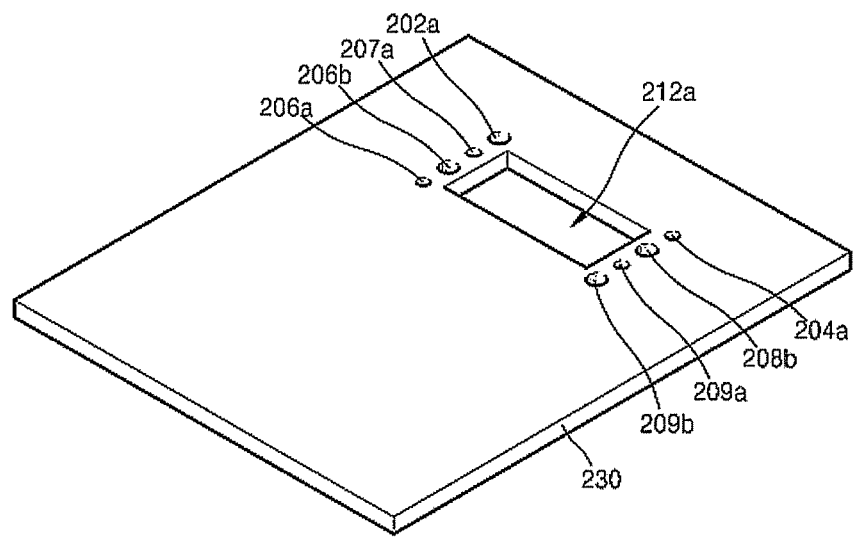

Referring to FIG. 5B, the first pattern layer 230 includes patterns, which are connected to flow paths of the first microfluidic device 10 (see FIG. 5A), and a window 212a. In detail, the patterns of the first pattern layer 230 include holes 202a, 206b, 208b and 209b which are aligned with the first through fourth inlet holes 21, 23, 28 and 26 (see FIG. 2A) of the first microfluidic device 10, and holes 206a, 207a, 209a and 204a which are aligned with the first through fourth outlet holes 24, 22, 27 and 29 of the first microfluidic device 10. The window 212a is formed by perforating the first pattern layer 230 and is aligned over the reaction chambers 12, 14, 16 and 18 of the first microfluidic device 10.

Figure 5C:
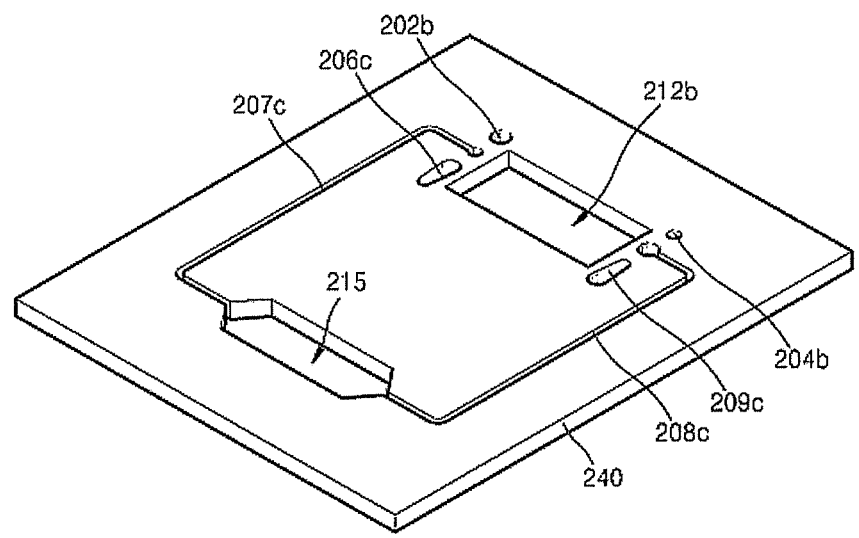

Referring to FIG. 5C, the second pattern layer 240 includes patterns, which are connected to the flow paths of the first microfluidic device 10 (see FIG. 5A) and the patterns formed on the first pattern layer 230 (see FIG. 5B), and a window 212b, which is formed by perforating the second pattern layer 240 and is aligned with the window 212a of the first pattern layer 230. In detail, the patterns of the second pattern layer 240 include a hole 202b which is aligned with the hole 202a of the first pattern layer 230, a hole 204b which is aligned with the hole 204a of the first pattern layer 230, four channels 206c, 207c, 208b and 209c and an apparatus chamber 215 which is disposed between the two channels 207c and 208b. Both ends of the channel 206c are aligned with the pair of holes 206a and 206b of the first pattern layer 230, and both ends of the channel 209c are aligned with the pair of holes 209a and 209b of the first pattern layer 230. An end of the channel 207c is aligned with the hole 207a of the first pattern layer 230, and an end of the channel 208b is aligned with the hole 208b of the first pattern layer 230. An end of each channel 207c and 208b is connected with the apparatus chamber 215.

Figure 5D:
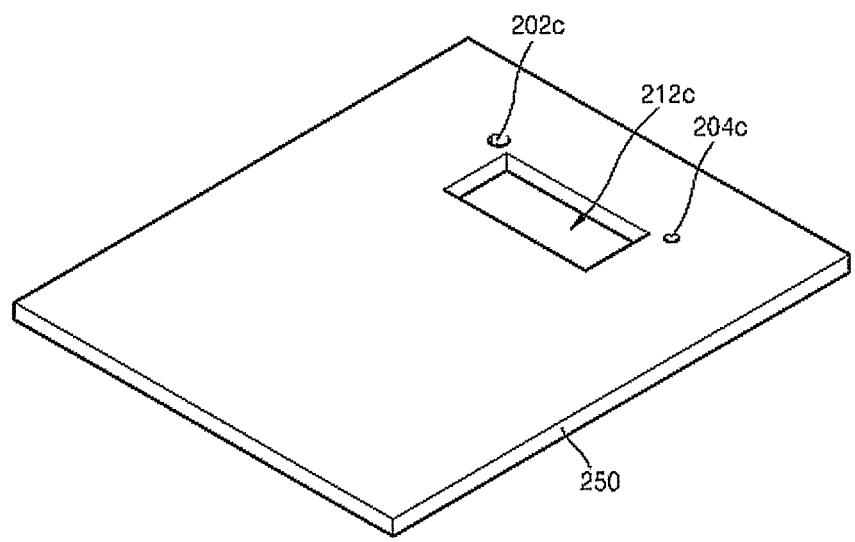

Referring to FIG. 5D, the third pattern layer 250 includes patterns which are connected to the flow paths of the first microfluidic device 10 (see FIG. 5A) and the patterns respectively formed on the first pattern layer 230 (see FIG. 5B) and the second pattern layer 240 (see FIG. 5C). The third pattern layer 250 further includes a window 212c which is perforated and is aligned over the windows 212a and 212b of the first and second pattern layers 230 and 240, respectively. In further detail, the patterns of the third pattern layer 250 include an inlet hole 202c which is aligned with the hole 202b of the second pattern layer 240, and an outlet hole 204c which is aligned with the hole 204b of the second pattern layer 240 (see FIGS. 5B and 5C).

The third pattern layer 250 is an outermost layer of the microfluidic apparatus 200 (see FIG. 4), and covers the apparatus chamber 215 and the channels 206c, 207c, 208b and 209c formed on the second pattern layer 240 such that the apparatus chamber 215 and the channels 206c, 207b, 208b and 209c are prevented from being exposed to the external environment of the microfluidic apparatus 200 (see FIG. 4). Fluids can be introduced into the microfluidic apparatus 200 through the inlet hole 202c, and fluids can be discharged to the external environment of the microfluidic apparatus 200 through the outlet hole 204c. Similar to the method of manufacturing the microfluidic apparatus 100 of FIG. 1, in exemplary embodiments, the respective layers 220, 230, 240 and 250 may be bonded together by plasma bonding or using a double-sided tape.

Referring to FIG. 4 again, the microfluidic apparatus 200, configured such that the four layers 220, 230, 240 and 250 are bonded together, includes an apparatus inlet hole 202 through which fluids are introduced into the first inlet hole 21 (see FIG. 5A) of the first microfluidic device 10 and an apparatus outlet hole 204 through which fluids are discharged from the fourth outlet hole 29 (see FIG. 5A) of the first microfluidic device 10 to the external environment of the microfluidic apparatus 200. The microfluidic apparatus 200 further includes a first apparatus channel 206, which connects the first outlet hole 24 (see FIG. 5A) with the second inlet hole 23 (see FIG. 5A) of the first microfluidic device 10, a second apparatus channel 207, which connects the second outlet hole 22 (see FIG. 5A) of the first microfluidic device 10 with the apparatus chamber 215, a third apparatus channel 208, which connects the apparatus chamber 215 with the third inlet hole 28 of the first microfluidic device 10 and a fourth apparatus channel 209, which connects the third outlet hole 27 with the fourth inlet hole 26 of the first microfluidic device 10. The microfluidic apparatus 200 further includes a window 112 which allows for a detection of a biochemical reaction occurring in the first microfluidic device 10 using fluorescence detection.

The apparatus inlet hole 202 is formed by connecting the hole 202a of the first pattern layer 230 with the hole 202b of the second pattern layer 240 and the inlet hole 202c of the third pattern layer 250, and the apparatus outlet hole 204 is formed by connecting the hole 204a of the first pattern layer 230 with the hole 204b of the second pattern layer 240 and the outlet hole 204c of the third pattern layer 250. The first apparatus channel 206 is formed by connecting the pair of holes 206a and 206b of the first pattern layer 230 with the channel 206c of the second pattern layer 240 and the second apparatus channel 207 is formed by connecting the hole 207a of the first pattern layer 230 with the channel 207c of the second pattern layer 240. The third apparatus channel 208 is formed by connecting the hole 208b of the first pattern layer 230 with the channel 208c of the second pattern layer 240 and the fourth apparatus channel 209 is formed by connecting the pair of holes 209a and 209b of the first pattern layer 230 with the channel 209c of the second pattern layer 240. The window 212 is formed by aligning the windows 212a, 212b and 212c of the first through third pattern layers 230, 240 and 250, respectively.

The inventors of the present invention conducted experiments by injecting fluids into the apparatus inlet hole 202 to determine whether the flow paths connected to the first microfluidic device 10 were formed in the microfluidic apparatus 200. The fluids injected into the apparatus inlet hole 202 flowed along the flow paths formed in the microfluidic apparatus 200 and then were discharged to the external environment of the microfluidic apparatus 200 through the apparatus outlet hole 204. There was no fluid leakage in the microfluidic apparatus 200.

Figure 6:
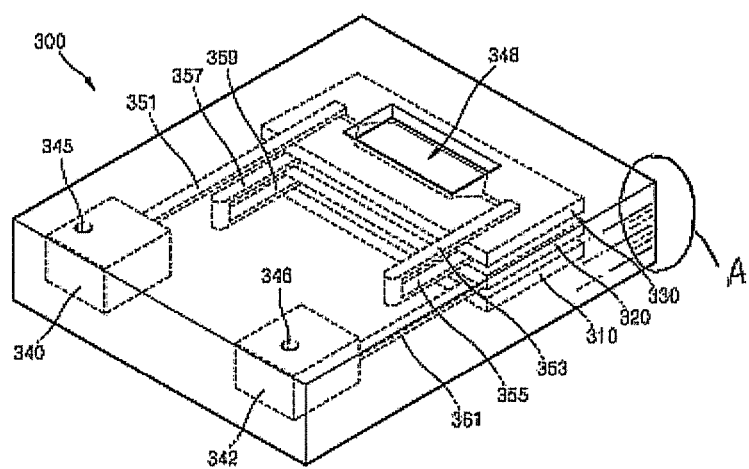
FIG. 6 is a front perspective schematic diagram view of another exemplary embodiment of a microfluidic apparatus including another exemplary embodiment of a microfluidic device according to the present invention.
Figure 6A:
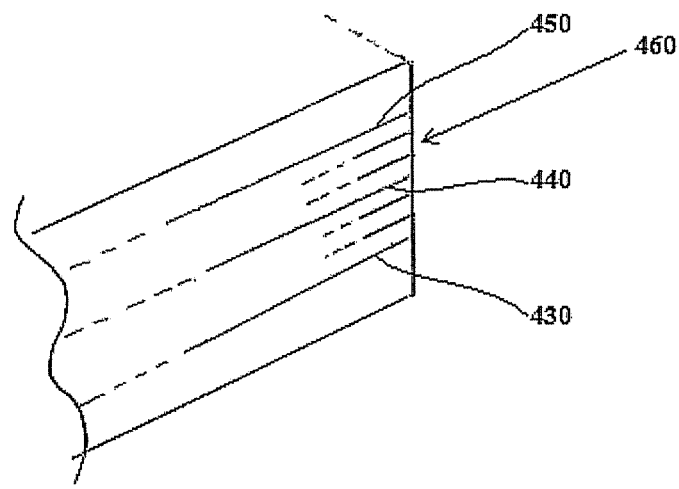
FIG. 6A is an enlarged front perspective schematic diagram view of portion 'A' of FIG. 6.

FIG. 6 is a front perspective schematic diagram view of another exemplary embodiment of a microfluidic apparatus including another exemplary embodiment of a microfluidic device according to the present invention. FIG. 6A is an enlarged front perspective schematic diagram view of portion 'A' of FIG. 6.

Similar to the microfluidic apparatus 100 of FIG. 1, in exemplary embodiments, a microfluidic apparatus 300 of FIG. 6 is a rectangular parallelpiped block made of a transparent polymer. Referring to FIG. 3, the microfluidic apparatus 300 is configured such that three microfluidic devices 310, 320 and 330 are stacked in the microfluidic apparatus 300. As shown in FIG. 6A, the microfluidic apparatus 300 includes three device receiving layers 430, 440 and 450 which receive the microfluidic devices 310, 320 and 330, and a plurality of pattern layers 460 which is disposed between adjacent device receiving layers. At least one pattern layer is stacked on an outermost layer of the microfluidic apparatus 300. Similar to the microfluidic apparatus 100 of FIG. 1, in exemplary embodiments, the plurality of device receiving layers and the plurality of pattern layers are bonded together by plasma bonding.

The microfluidic apparatus 300 includes a first apparatus chamber 340 which acts as a reservoir, a second apparatus chamber 342 in which fluids sequentially passing through the microfluidic devices 330, 320 and 310 are contained, an apparatus inlet hole 345 through which external fluids are introduced into the first apparatus chamber 340 and an apparatus outlet hole 346 through which the fluids contained in the second apparatus chamber 342 are discharged to the external environment of the microfluidic apparatus 300. The microfluidic apparatus 300 further includes first through sixth apparatus channels 351, 353, 355, 357, 359 and 361, and an apparatus window 348 which allows for a detection of a biochemical reaction occurring in the third microfluidic device 330 using fluorescence detection.

When fluids were introduced through the apparatus inlet hole 345, the fluids were received in the first apparatus chamber 340 and then transferred along the first apparatus channel 351 to the third microfluidic device 330. Fluids passing through the third microfluidic device 330 flowed along the second apparatus channel 353 and the third apparatus channel 355, and then the fluids were transferred to the second microfluidic device 320. Fluids passing through the second microfluidic device 320 flowed along the fourth apparatus channel 357 and the fifth apparatus channel 359, and then the fluids were transferred to the first microfluidic device 310. Fluids passing through the first microfluidic device 310 flowed along the sixth apparatus channel 361, were received in the second apparatus chamber 342, and then the fluids were discharged to the external environment of the microfluidic apparatus 300 through the apparatus outlet hole 346 when the second apparatus chamber 342 was filled with the fluids.

Since the plurality of microfluidic devices 310, 320 and 330 are stacked, the microfluidic apparatus 300 can be more integrated and miniaturized than a microfluidic apparatus in which a plurality of microfluidic devices are disposed on a single substrate.

As described above, since a microfluidic apparatus according to the present invention includes a microfluidic device which can be miniaturized and simply manufactured, manufacturing costs thereof can be reduced and miniaturization and integration can be facilitated, when compared with a conventional device which becomes complex in order to perform complex processes for biochemical reactions.

While the present invention has been particularly shown and described with reference to some exemplary embodiments thereof, it will be understood by those of ordinary skill in the art that various changes in form and details may be made therein without departing from the spirit and scope of the present invention as defined by the following claims.

What is claimed is:

1. A microfluidic apparatus comprising:
   at least one microfluidic device in which fluid channel paths are formed;
   a device receiving layer including a receiving part into which the at least one microfluidic device is inserted; and
   a plurality of fluid channel layers disposed on an upper surface of the device receiving layer, the fluid channel layers having fluid channels connected to the fluid channel paths of the at least one microfluidic device,
   wherein each of the plurality of fluid channel layers includes an upper surface and a lower surface, the lower surface of each of the plurality of fluid channel layers is disposed covering an entire upper surface of an adjacent lower layer thereof to prevent fluid leakage,
   a lower surface of an inner most fluid channel layer directly contacts the at least one microfluidic device, the inner most fluid channel layer being disposed to cover an entire surface of the upper surface of the device receiving layer,
   fluid channels of an outermost fluid channel layer comprise an inlet hole through which fluids are introduced into the at least on microfluidic device and an outlet hole through which fluids are discharged to an external environment from at least one microfluidic device, and
   each of the inlet hole and the outlet hole is passing through the upper surface and the lower surface of the outermost fluid channel layer.

2. The microfluidic apparatus of claim 1, wherein the adjacent lower layer is an adjacent device receiving layer or an adjacent fluid channel layer of the plurality of fluid channel layers.

3. The microfluidic apparatus of claim 2, wherein the device receiving layer includes a plurality of device receiving layers, and at least one of the plurality of fluid channel layers is disposed between adjacent device receiving layers of the plurality of device receiving layers.

4. The microfluidic apparatus of claim 3, wherein the plurality of device receiving layers and the plurality of fluid channel layers are bonded together by plasma bonding or using a double-sided tape.

5. The microfluidic apparatus of claim 1, wherein the at least one microfluidic device comprises a substrate made of silicon or glass.

6. The microfluidic apparatus of claim 1, wherein the fluid channels of the plurality of fluid channel layers comprise at least one of holes, channels and chambers.

7. The microfluidic apparatus of claim 1, wherein the device receiving layer and the plurality of fluid channel layers are made of a polymer.

8. The microfluidic apparatus of claim 7, wherein the polymer is polydimethylsyloxane.

9. The microfluidic apparatus of claim 1, wherein each of a plurality of microfluidic devices is stacked in the microfluidic apparatus.

10. The microfluidic apparatus of claim 1, wherein the device receiving layer and the plurality of fluid channel layers constituting the microfluidic apparatus are bonded together by one of plasma bonding or using a double-sided tape.

11. The microfluidic apparatus of claim 1, wherein the plurality of fluid channel layers is transparent such that a fluid reaction occurring in the microfluidic device can be detected using fluorescence detection.

12. The microfluidic apparatus of claim 1, wherein the plurality of fluid channel layers comprises a window through which a fluid reaction occurring in the at least one microfluidic device can be detected using fluorescence detection.

* * * * *